(12) United States Patent
Tan et al.

(10) Patent No.: US 12,167,323 B2
(45) Date of Patent: Dec. 10, 2024

(54) SYSTEMS AND METHODS FOR GENERATING A TARGET HOTSPOT LIST

(71) Applicant: ZHEJIANG DAHUA TECHNOLOGY CO., LTD., Zhejiang (CN)

(72) Inventors: Shenqiu Tan, Hangzhou (CN); Tao Wu, Hangzhou (CN); Hui Li, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 405 days.

(21) Appl. No.: 17/646,488

(22) Filed: Dec. 30, 2021

(65) Prior Publication Data
US 2022/0124608 A1   Apr. 21, 2022

Related U.S. Application Data

(63) Continuation of application No. PCT/CN2020/102950, filed on Jul. 20, 2020.

(30) Foreign Application Priority Data

Aug. 27, 2019   (CN) .......................... 201910796264.5

(51) Int. Cl.
H04W 4/00        (2018.01)
H04W 8/00        (2009.01)
(Continued)

(52) U.S. Cl.
CPC .......... *H04W 48/16* (2013.01); *H04W 8/005* (2013.01); *H04W 84/12* (2013.01)

(58) Field of Classification Search
CPC ..... H04W 48/16; H04W 84/12; H04W 8/005; H04W 8/00
(Continued)

(56) References Cited

U.S. PATENT DOCUMENTS 7,639,387 B2 * 12/2009 Hull ....................... G06V 30/40
                                                              715/201
9,055,400 B1 *  6/2015 Lee ....................... H04W 4/023
(Continued)

FOREIGN PATENT DOCUMENTS

CN      105142203 A     12/2015
CN      105871595 A      8/2016
(Continued)

OTHER PUBLICATIONS

International Search Report in PCT/CN2020/102950 mailed on Oct. 21, 2020, 4 pages.
(Continued)

*Primary Examiner* — Marceau Milord
(74) *Attorney, Agent, or Firm* — METIS IP LLC

(57) ABSTRACT

Systems and methods for determining a target hotspot list are provided. The system may obtain a first hotspot list generated by a first device. The first hotspot list may include one or more first hotspots detected by the first device. The system may obtain a second hotspot list generated by a second device. The second hotspot list may include one or more second hotspots detected by the second device. The system may generate the target hotspot list related to the second device based on the first hotspot list and the second hotspot list. In some embodiments, the system may further determine a target hotspot in the target hotspot list and send identification information associated with the target hotspot to the second device, such that the second device can be connected with the target hotspot.

20 Claims, 9 Drawing Sheets

(51) Int. Cl.
*H04W 48/16* (2009.01)
*H04W 84/12* (2009.01)

(58) Field of Classification Search
USPC .......................................................... 370/329
See application file for complete search history.

(56) References Cited

U.S. PATENT DOCUMENTS

| | | | |
|---|---|---|---|
| 9,838,840 B1* | 12/2017 | Lee ........................ | H04W 4/06 |
| 10,327,254 B2* | 6/2019 | Thanayankizil ...... | H04W 76/10 |
| 10,366,246 B2* | 7/2019 | Lee ........................ | G06F 21/44 |
| 11,659,580 B2* | 5/2023 | Jetcheva ............... | H04W 72/27 |
| | | | 370/254 |
| 2007/0047781 A1* | 3/2007 | Hull ....................... | G06V 30/40 |
| | | | 382/124 |
| 2007/0259670 A1* | 11/2007 | Sakhpara .............. | H04W 24/00 |
| | | | 455/452.2 |
| 2008/0049702 A1 | 2/2008 | Meylan et al. | |
| 2009/0253392 A1 | 10/2009 | Colonna | |
| 2010/0197319 A1* | 8/2010 | Petersen ............... | H04W 4/029 |
| | | | 455/456.1 |
| 2011/0171909 A1* | 7/2011 | Jung ..................... | H04W 52/0254 |
| | | | 455/41.2 |
| 2013/0065627 A1 | 3/2013 | Jung et al. | |
| 2013/0272288 A1 | 10/2013 | Li et al. | |
| 2014/0036768 A1 | 2/2014 | Gao et al. | |
| 2014/0036788 A1* | 2/2014 | Ganu .................... | H04W 52/367 |
| | | | 370/329 |
| 2014/0286326 A1 | 9/2014 | Jang et al. | |
| 2015/0043362 A1 | 2/2015 | Sankar et al. | |
| 2015/0081860 A1* | 3/2015 | Kuehnel ................ | G06F 21/35 |
| | | | 709/224 |
| 2016/0037444 A1 | 2/2016 | Jung et al. | |
| 2016/0050592 A1* | 2/2016 | Kim ....................... | H04W 48/16 |
| | | | 455/434 |
| 2016/0113045 A1* | 4/2016 | Kang .................... | H04W 12/50 |
| | | | 370/338 |
| 2016/0308768 A1* | 10/2016 | Yoon ....................... | H04L 47/11 |
| 2017/0243023 A1* | 8/2017 | Lee ....................... | G06F 21/6218 |
| 2019/0182721 A1* | 6/2019 | Cabral .............. | H04W 36/0022 |

FOREIGN PATENT DOCUMENTS

| | | |
|---|---|---|
| CN | 106304013 A | 1/2017 |
| CN | 106937288 A | 7/2017 |
| CN | 107613552 A | 1/2018 |
| CN | 108111971 A | 6/2018 |
| CN | 108184245 A | 6/2018 |
| CN | 109640377 A | 4/2019 |
| EP | 2645783 A1 | 10/2013 |
| EP | 2757829 A1 | 7/2014 |
| EP | 2996394 A1 | 3/2016 |
| WO | 2013178103 A1 | 12/2013 |
| WO | 2018023937 A1 | 2/2018 |
| WO | 2021036576 A1 | 3/2021 |

OTHER PUBLICATIONS

Written Opinion in PCT/CN2020/102950 mailed on Oct. 21, 2020, 5 pages.
First Office Action in Chinese Application No. 201910796264.5 mailed on Jan. 25, 2021, 11 pages.
The Extended European Search Report in European Application No. 20857572.0 mailed on Jun. 22, 2022, 12 pages.

* cited by examiner

SYSTEMS AND METHODS FOR GENERATING A TARGET HOTSPOT LIST

CROSS-REFERENCE TO RELATED APPLICATIONS

This application is a Continuation of International Application No. PCT/CN2020/102950, filed on Jul. 20, 2020, which claims priority of Chinese Patent Application No. 201910796264.5, filed on Aug. 27, 2019, the entire content of which is incorporated herein by reference.

TECHNICAL FIELD

The present disclosure generally relates to the field of wireless communication technology, and in particular, to systems and methods for generating a target hotspot list.

BACKGROUND

In recent years, with the development of the Internet of Things technology, more and more smart devices are connected to the network through wireless fidelity (WIFI) technology. Usually, due to the limitation of, such as cost, power consumption, or volume, the smart device(s) are not equipped with input devices such as a display screen and/or a keyboard. The network connection of the smart device(s) may be performed via a terminal device. In some embodiments, there is only interaction of distribution network information between the terminal device and the smart device(s), which is impossible to detect and solve the problem when the distribution network information is incorrect. For example, the terminal device may present a hotspot list generated based on its detection result for a user to select. However, wireless capacities of the terminal device and the smart device(s) are different, which results in that the presented hotspot list may include one or more hotspots that the smart device(s) are not capable of being connected with. Therefore, it is desirable to provide systems and methods for generating a target hotspot list for the smart device(s), thereby improving the efficiency and accuracy of the network connection of the smart device(s).

SUMMARY

In an aspect of the present disclosure, In another aspect of the present disclosure, a method implemented on a computing device including at least one storage device and at least one processor in communication with the at least one storage device is provided. is provided. The method may include obtaining a first hotspot list generated by a first device. The first hotspot list may include one or more first hotspots detected by the first device. The method may also include obtaining a second hotspot list generated by a second device. The second hotspot list may include one or more second hotspots detected by the second device. The method may further include generating a target hotspot list related to the second device based on the first hotspot list and the second hotspot list.

In some embodiments, the obtaining a second hotspot list generated by a second device may include generating one or more detection parameters related to the one or more first hotspots, sending the one or more detection parameters to the second device, and receiving the second hotspot list from the second device, the second hotspot list is generated based on the one or more detection parameters.

In some embodiments, the generating one or more detection parameters may include obtaining hotspot information associated with at least one channel, determining channel information based on the hotspot information, and generating the one or more detection parameters based on the channel information. Each of the one or more first hotspots may be within one of the at least one channel.

In some embodiments, the one or more detection parameters may include at least one of a channel number, a detection duration, a count of first hotspots, a count of detection times, a frequency range, or a center frequency, of each of the at least one channel.

In some embodiments, the generating a target hotspot list related to the second device based on the first hotspot list and the second hotspot list may include determining a type of each of the one or more first hotspots; determining one or more candidate hotspots based on the type of each of the one or more first hotspots; and determining the target hotspot list based on the one or more candidate hotspots and the one or more second hotspots.

In some embodiments, the determining a type of each of the one or more first hotspots may include determining a frequency band associated with each of the one or more first hotspots and determining the type of each of the one or more first hotspots based on the frequency band associated with each of the one or more first hotspots.

In some embodiments, the determining the target hotspot list based on the one or more candidate hotspots and the one or more second hotspots may include determining, based on the one or more candidate hotspots and the one or more second hotspots, one or more initial hotspots, determining that at least one of the one or more initial hotspots satisfies a preset condition, and determining the target hotspot list based on the at least one of the one or more initial hotspots.

In some embodiments, the preset condition may be associated with at least one of a preset signal quality, a preset safety, a preset type of a network protocol, a preset access requirement, or a preset data transmission rate.

In some embodiments, the method may further include determining a first target hotspot in the target hotspot list, determining first identification information associated with the first target hotspot, determining whether the first device is capable of being connected with the first target hotspot based on the first identification information, and in response to a determination that the first device is capable of being connected with the first target hotspot based on the first identification information, sending the first identification information to the second device such that the second device can be connected with the first target hotspot.

In some embodiments, in response to a determination that the first device is not capable of being connected with the first target hotspot based on the identification information, the method may further include determining a second target hotspot in the target hotspot list and determining second identification information associated with the second hotspot.

In another aspect of the present disclosure, a system is provided. The system may include at least one storage device including a set of instructions and at least one processor in communication with the at least one storage device. When executing the set of instructions, the at least one processor may be configured to direct the system to perform the following operations. The operations may include obtaining a first hotspot list generated by a first device. The first hotspot list may include one or more first hotspots detected by the first device. The operations may include obtaining a second hotspot list generated by a second device. The operations may further include generating a target hotspot list related to the second device based on the first hotspot list and the second hotspot list. The second hotspot list may include one or more second hotspots detected by the second device.

In some embodiments, the obtaining a second hotspot list generated by a second device may include generating one or more detection parameters related to the one or more first hotspots, sending the one or more detection parameters to the second device, and receiving the second hotspot list from the second device, the second hotspot list is generated based on the one or more detection parameters.

In some embodiments, the generating one or more detection parameters may include obtaining hotspot information associated with at least one channel, determining channel information based on the hotspot information, and generating the one or more detection parameters based on the channel information. Each of the one or more first hotspots may be within one of the at least one channel.

In some embodiments, the one or more detection parameters may include at least one of a channel number, a detection duration, a count of first hotspots, a count of detection times, a frequency range, or a center frequency, of each of the at least one channel.

In some embodiments, the generating a target hotspot list related to the second device based on the first hotspot list and the second hotspot list may include determining a type of each of the one or more first hotspots, determining one or more candidate hotspots based on the type of each of the one or more first hotspots, and determining the target hotspot list based on the one or more candidate hotspots and the one or more second hotspots.

In some embodiments, the determining a type of each of the one or more first hotspots may include determining a frequency band associated with each of the one or more first hotspots and determining the type of each of the one or more first hotspots based on the frequency band associated with each of the one or more first hotspots.

In some embodiments, the determining the target hotspot list based on the one or more candidate hotspots and the one or more second hotspots may include determining, based on the one or more candidate hotspots and the one or more second hotspots, one or more initial hotspots, determining that at least one of the one or more initial hotspots satisfies a preset condition, and determining the target hotspot list based on the at least one of the one or more initial hotspots.

In some embodiments, the preset condition may be associated with at least one of a preset signal quality, a preset safety, a preset type of a network protocol, a preset access requirement, or a preset data transmission rate.

In some embodiments, the operations may further include determining a first target hotspot in the target hotspot list. The operations may also include determining first identification information associated with the first target hotspot. The operations may also include determining whether the first device is capable of being connected with the first target hotspot based on the first identification information. In response to a determination that the first device is capable of being connected with the first target hotspot based on the first identification information, the operations may further include sending the first identification information to the second device such that the second device can be connected with the first target hotspot.

In some embodiments, in response to a determination that the first device is not capable of being connected with the first target hotspot based on the identification information, the operations may further include determining a second target hotspot in the target hotspot list and determining second identification information associated with the second hotspot.

In another aspect of the present disclosure, a system is provided. The system may include an obtaining module and a generation module. The obtaining module may be configured to obtain a first hotspot list generated by a first device and a second hotspot list generated by a second device. The first hotspot list may include one or more first hotspots detected by the first device. The second hotspot list may include one or more second hotspots detected by the second device. The generation module configured to generate a target hotspot list related to the second device based on the first hotspot list and the second hotspot list.

In another aspect of the present disclosure, a non-transitory computer readable medium is provided. The non-transitory computer readable medium may include executable instructions that, when executed by at least one processor, direct the at least one processor to perform a method. The method may include obtaining a first hotspot list generated by a first device. The first hotspot list may include one or more first hotspots detected by the first device. The method may also include obtaining a second hotspot list generated by a second device. The second hotspot list may include one or more second hotspots detected by the second device. The method may further include generating a target hotspot list related to the second device based on the first hotspot list and the second hotspot list.

In another aspect of the present disclosure, a method implemented on a computing device including at least one storage device and at least one processor in communication with the at least one storage device is provided. The method may include obtaining one or more detection parameters from a first device. The method may also include generating, based on the one or more detection parameters, a hotspot list related to a second device. The method may further include sending the hotspot list to the first device, the first device can generate a target hotspot list related to the second device based on the hotspot list.

In some embodiments, the one or more detection parameters may include at least one of a channel number, a detection time, a count of hotspots, a count of detection times, a frequency range, or a center frequency, of at least one channel.

In some embodiments, the generating, based on the one or more detection parameters, a hotspot list may include detecting, based on the one or more detection parameters, one or more hotspots in the at least one channel and generating the hotspot list based on the one or more hotspots. During the detection, the method may further include determining whether a count of detected channels is larger than a preset count and in response to determining that the count of detected channels is larger than the preset count, recovering a connection between the first device and the second device.

In some embodiments, the method may further include obtaining identification information associated with a target hotspot in the target hotspot list from the first device and connecting the second device with the target hotspot based on the identification information.

In another aspect of the present disclosure, a system is provided. The system may include at least one storage device including a set of instructions and at least one processor in communication with the at least one storage device. When executing the set of instructions, the at least one processor may be configured to direct the system to perform the following operations. The operations may include obtaining one or more detection parameters from a first device. The operations may also include generating, based on the one or more detection parameters, a hotspot list related to a second device. The operations may further include sending the hotspot list to the first device, the first device can generate a target hotspot list related to the second device based on the hotspot list.

In some embodiments, the one or more detection parameters may include at least one of a channel number, a detection time, a count of hotspots, a count of detection times, a frequency range, or a center frequency, of at least one channel.

In some embodiments, the generating, based on the one or more detection parameters, a hotspot list may include detecting, based on the one or more detection parameters, one or more hotspots in the at least one channel and generating the hotspot list based on the one or more hotspots. During the detection, the at least one processor may further be configured to direct the system to perform the following operations. The operations may include determining whether a count of detected channels is larger than a preset count and in response to determining that the count of detected channels is larger than the preset count, recovering a connection between the first device and the second device.

In some embodiments, the operations may further include obtaining identification information associated with a target hotspot in the target hotspot list from the first device and connecting the second device with the target hotspot based on the identification information.

In another aspect of the present disclosure, a system is provided. The system may include an obtaining module, a generation module, and a transmission module. The obtaining module may be configured to obtain one or more detection parameters from a first device. The generation module may be configured to generate, based on the one or more detection parameters, a hotspot list related to a second device. The transmission module sending the hotspot list to the first device, the first device can generate a target hotspot list related to the second device based on the hotspot list.

In another aspect of the present disclosure, a non-transitory computer readable medium is provided. The non-transitory computer readable medium may include executable instructions that, when executed by at least one processor, direct the at least one processor to perform a method. The method may include obtaining one or more detection parameters from a first device. The method may also include generating, based on the one or more detection parameters, a hotspot list related to a second device. The method may further include sending the hotspot list to the first device, the first device can generate a target hotspot list related to the second device based on the hotspot list.

In another aspect of the present disclosure, a method implemented on a computing device including at least one storage device and at least one processor in communication with the at least one storage device is provided. The method may include obtaining, by a first device, a target hotspot list related to a second device. The method may also include determining a target hotspot in the target hotspot list. The method may further include sending identification information associated with the target hotspot to the second device such that the second device can be connected with the target hotspot.

In some embodiments, the determining a target hotspot in the target hotspot list may include determining a first initial target hotspot in the target hotspot list, determining first identification information associated with the first initial target hotspot, determining whether the first device is capable of being connected with the first initial target hotspot based on the first identification information, and in response to a determination that the first device is capable of being connected with the first initial target hotspot based on the first identification information, determining the first initial target hotspot as the target hotspot.

In some embodiments, the sending identification associated with the target hotspot to a second device may include in response to a determination that the first device is capable of being connected with the first initial target hotspot based on the first identification information, sending the first identification information to the second device.

In some embodiments, in response to a determination that the first device is not capable of being connected with the first initial target hotspot based on the first identification information, the method may further include determining a second initial target hotspot in the target hotspot list and determining second identification information associated with the second candidate hotspot.

In some embodiments, the obtaining a target hotspot list may include obtaining a first hotspot list generated by the first device, obtaining a second hotspot list generated by the second device, and generating the target hotspot list related to the second device based on the first hotspot list and the second hotspot list. The first hotspot list may include one or more first hotspots detected by the first device. The second hotspot list may include one or more second hotspots detected by the second device.

In another aspect of the present disclosure, a system is provided. The system may include at least one storage device including a set of instructions; and at least one processor in communication with the at least one storage device. When executing the set of instructions, the at least one processor may be configured to direct the system to perform the following operations. The operation may include obtaining, by a first device, a target hotspot list related to a second device. The operations may also include determining a target hotspot in the target hotspot list. The operations may further include sending identification information associated with the target hotspot to the second device such that the second device can be connected with the target hotspot.

In some embodiments, the determining a target hotspot in the target hotspot list may include determining a first initial target hotspot in the target hotspot list, determining first identification information associated with the first initial target hotspot, determining whether the first device is capable of being connected with the first initial target hotspot based on the first identification information, and in response to a determination that the first device is capable of being connected with the first initial target hotspot based on the first identification information, determining the first initial target hotspot as the target hotspot.

In some embodiments, the sending identification associated with the target hotspot to a second device may include in response to a determination that the first device is capable of being connected with the first initial target hotspot based on the first identification information, sending the first identification information to the second device.

In some embodiments, in response to a determination that the first device is not capable of being connected with the first initial target hotspot based on the first identification information, the operations may further include determining a second initial target hotspot in the target hotspot list and determining second identification information associated with the second candidate hotspot.

In some embodiments, the obtaining a target hotspot list may include: obtaining a first hotspot list generated by the first device, obtaining a second hotspot list generated by the second device, and generating the target hotspot list related to the second device based on the first hotspot list and the second hotspot list. The first hotspot list may include one or more first hotspots detected by the first device. The second hotspot list may include one or more second hotspots detected by the second device.

In another aspect of the present disclosure, a system is provided. The system may include an obtaining module, a determination module, and a transmission module. The obtaining module may be configured to obtain, by a first device, a target hotspot list related to a second device. The determination module may be configured to determine a target hotspot in the target hotspot list. The transmission module may be configured to send identification information associated with the target hotspot to the second device such that the second device can be connected with the target hotspot.

In another aspect of the present disclosure, a non-transitory computer readable medium is provided. The non-transitory computer readable medium may include executable instructions that, when executed by at least one processor, direct the at least one processor to perform a method. The method may include obtaining, by a first device, a target hotspot list related to a second device. The method may also include determining a target hotspot in the target hotspot list. The method may further include sending identification information associated with the target hotspot to the second device such that the second device can be connected with the target hotspot.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
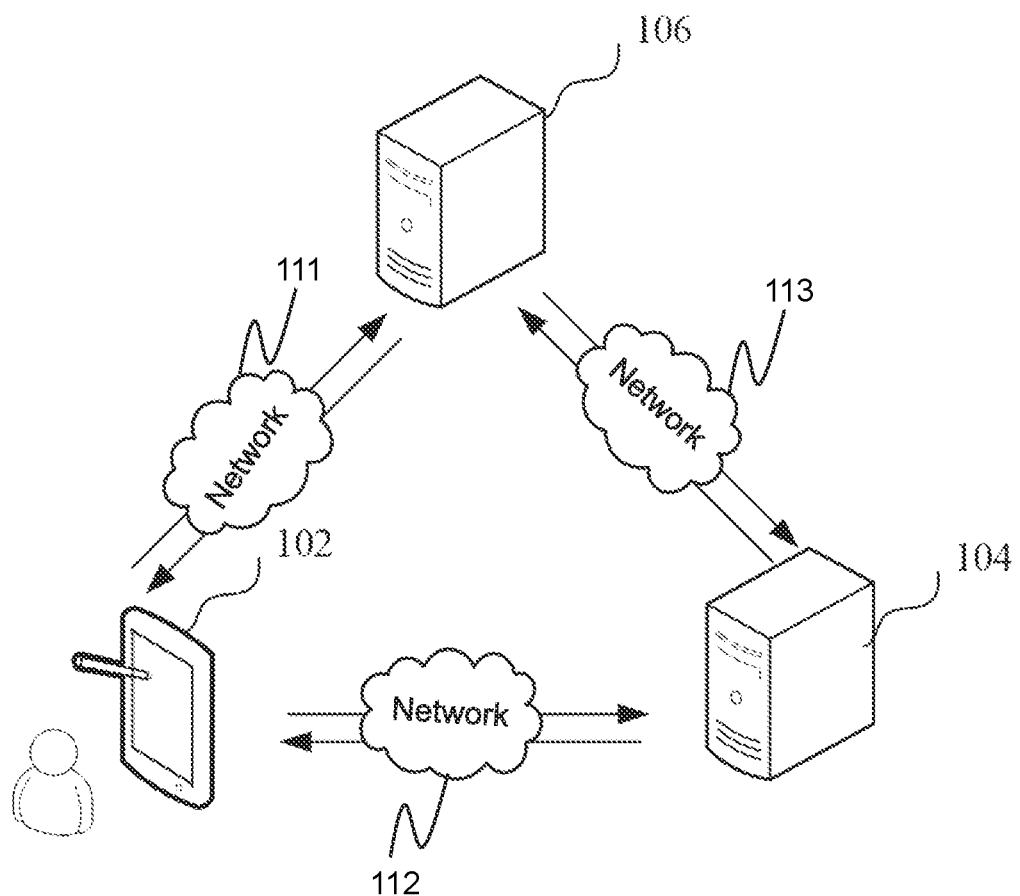
FIG. 1 is a schematic diagram illustrating an exemplary system for network connection according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, sections or assemblies of different levels in ascending order. However, the terms may be displaced by other expression(s) if they may achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device(s). In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An aspect of the present disclosure relates to a system and method for determining a target hotspot list. The system may obtain a first hotspot list generated by a first device (e.g., a terminal device) and a second hotspot list generated by a second device (e.g., a smart device). The first hotspot list may include one or more first hotspots detected by the first device. The second hotspot list may include one or more second hotspots detected by the second hotspots. The system may further generate the target hotspot list related to the second device based on the first hotspot list and the second hotspot list. According to some embodiments of the present disclosure, the first hotspot list and the second hotspot list may be combined to generate the target hotspot list for the second device, which contributes to more reliable hotspot information for the second device and further improves the possibility of the second device connecting to a specific hotspot.

In some embodiments, the smart device may obtain one or more detection parameters from the terminal device, based on which the smart device may generate the second hotspot list. The smart device may further send the second hotspot list to the terminal device for generating the target hotspot list. By generating the second hotspot list based on the detection parameter(s), the efficiency of the smart device for detecting possible hotspots and generating the second hotspot list may be improved.

In some embodiments, the terminal device may determine a target hotspot in the target hotspot list. The terminal device may determine whether it is capable of being connected with the target hotspot based on identification information associated with the target hotspot. In response to a determination that the terminal device is capable of being connected with the target hotspot, the terminal device may send the identification information to the smart device such that the smart device can be connected with the target hotspot. Therefore, the network connection of the smart device can be achieved efficiently and accurately, which improves a success rate for network connection.

FIG. 1 is a schematic diagram illustrating an exemplary system for network connection according to some embodiments of the present disclosure. As shown in FIG. 1, the system 100 may include a first device 102, a second device 104, and a third device 106.

The first device 102 may be any electronic device used by a user and also be referred to a terminal device 102. The first device 102 may be configured to facilitate communication between the user and the second device 104. For example, the user may control the second device 104 via the first device 102 (e.g., controlling an open or closed state of the second device 104, or controlling the second device 104 to perform its function(s)). As another example, the first device 102 may generate a target hotspot list related to the second device 104 based on a first hotspot list generated by the first device 102 and a second hotspot list generated by the second device 104. As still another example, the first device 102 may determine a target hotspot in the target hotspot list and send identification information associated with the target hotspot to the second device 104, such that the second device 104 can be connected to the target hotspot. In some embodiments, the terminal device 102 may include a device with functions of network connection and data transmission, such as a mobile device, a tablet computer, a laptop computer, a built-in device in a vehicle, a wearable device, or the like, or any combination thereof. In some embodiments, the mobile device may include a smart mobile device, a virtual reality device, an augmented reality device, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include Google™ Glasses, an Oculus Rift™, a HoloLens™, a Gear VR™, etc. In some embodiments, the built-in device in the vehicle may include an onboard computer, an onboard television, etc. In some embodiments, the wearable device may include a smart bracelet, a smart footgear, smart glasses, a smart helmet, a smart watch, smart clothing, a smart backpack, a smart accessory, or the like, or any combination thereof. In some embodiments, the terminal device 102 may include one or more components illustrated in FIG. 2A, or be implemented on a computing device 200 illustrated in FIG. 2B in the present disclosure. More descriptions regarding the first device 102 may be found elsewhere in the present disclosure (e.g., FIGS. 2A and 2B and the descriptions thereof).

The second device 104 may include any smart/intelligence device which can be connected with a network and also be referred to as a wireless device 104. In some embodiments, the second device 104 may have at least two modes including a soft access point (AP) mode and a station (SAT) mode. As used herein, the soft AP mode may refer to that, when the second device 104 is not connected with a network, the second device 104 may serve as a hotspot to provide a wireless access point that allows other devices to connect with. The soft AP mode may also be referred to as a hotspot mode. The STA mode may refer to that, when the second device 104 is connected with a network, the second device 104 may be similar to a wireless terminal and not provide any wireless access point. For example, when the second device 104 is in the soft AP mode, the second device 104 may serve as a hotspot. The first device 102 may be connected with the second device 104 via a network 112 to communicate with the second device 104. The network 112 may include a Bluetooth network, a ZigBee network, a near field communication (NFC) network, or the like, or any combination thereof. In some embodiments, the smart device may include a smart lighting device, a control device of an intelligent electrical apparatus, a smart monitoring device, a smart television, a smart video camera, a smart air purifier, an intelligent speaker, an intelligent access control device, a sweeping robot, or the like, or any combination thereof. In some embodiments, the second device 104 may include one or more components illustrated in FIG. 3A, or be implemented on a computing device 300 illustrated in FIG. 3B. More descriptions regarding the second device 104 may be found elsewhere in the present disclosure (e.g., FIGS. 3A and 3B and the descriptions thereof).

The third device 106 may be any device (e.g., a router device or a switcher device) that can provide a data transfer service among various networks and also be referred to as a gateway device 106. In some embodiments, the third device 106 may provide at least one access point, e.g., at least one hotspot. The first device 102 and/or the second device 104 may detect one or more hotspots of the at least one hotspot. The first device 102 and/or the second device 104 may further be connected with one of the detected hotspot(s), which may also be referred to as being connected with the third device 106. In some embodiments, the first device 102 and/or the second device 104 may be connected with a same hotspot and/or different hotspots. For example, when the first device 102 is connected with a hotspot provided by the third device 106, the first device 102 may be connected with the third device 106 and access a network 111. When the second device 104 is connected with a hotspot provided by the third device 106, the second device 104 may be connected with the third device 106 and access a network 113. When the first device 102 and the second device 104 are connected with a same hotspot, the first device 102 and the second device 104 may access a same network, i.e., the network 111 may be the same as the network 113. The first device 102 may further cause the second device 104 to perform one or more functions via the same network.

It should be noted that the above description regarding the system 100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the first device 102 may serve as a hotspot and the second device 104 may be connected with the hotspot to access a mobile network (e.g., a 3G, a 4G, or a 5G network). In some embodiments, the third device 106 may include a terminal device that can provide one or more access points for other devices to achieve a wireless network connection. In some embodiments, the first device 102 may be configured with an application associated with the second device 104. When the application is activated (e.g., by the user), the first device 102 may be triggered to perform one or more functions (e.g., determining the target hotspot list and/or the target hotspot) as described elsewhere in the present disclosure. In some embodiments, the system 100 may include more than one third device 106 each of which may provide hotspot(s) for network connection.

Figure 2A:
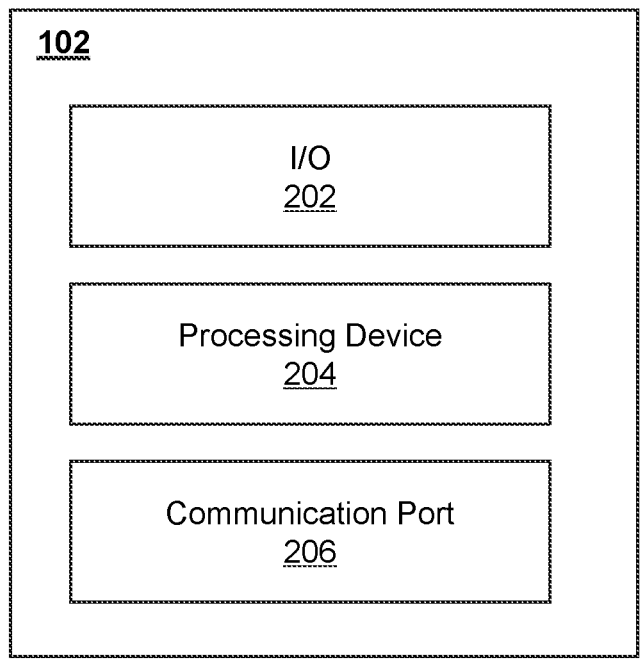
FIG. 2A is a schematic diagram illustrating an exemplary first device according to some embodiments of the present disclosure.

FIG. 2A is a schematic diagram illustrating an exemplary first device according to some embodiments of the present disclosure. As shown in FIG. 2A, the first device 102 may include an input/output (I/O) 202, a processing device 204, and a communication port 206.

The I/O 202 may enable user interaction with the first device 102. For example, the I/O 202 may receive a request (e.g., a request for connecting a hotspot) and/or data (e.g., identification information associated with a hotspot) from a user of the first device 102. As another example, the I/O 202 may display a target hotspot list related to a second device (e.g., the second device 104) to the user for selection. In some embodiments, the I/O 202 may include an input component and/or an output component. Exemplary input components may include a keyboard, a mouse, a touch screen, a microphone, or the like, or a combination thereof. Exemplary output components may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), a touch screen, or the like, or a combination thereof.

The processing device 204 may process information and/or data relating to the first device 102 and/or the second device 104 to perform one or more functions of the first device 102 described in the present disclosure. For example, the processing device 204 may detect one or more first hotspots and generate a first hotspot list based on the detected first hotspot(s). The processing device 204 may obtain a second hotspot list including one or more second hotspots from the second device 104. The processing device 204 may generate a target hotspot list related to the second device 104 based on the first hotspot list and the second hotspot list. As another example, the processing device 204 may determine a target hotspot in the target hotspot list which the first device 102 is capable of being connected with and send the target hotspot to the second device 104. In some embodiments, the processing device 204 may include one or more processing devices (e.g., single-core processing device(s) or multi-core processor(s)). Merely by way of example, the processing device 204 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

Merely for illustration, only one processing device may be described in the first device 102. However, it should be noted that the first device 102 of the present disclosure may also include multiple processing devices, and thus operations and/or method steps that are performed by one processing device as described in the present disclosure may also be jointly or separately performed by the multiple processing devices. For example, if in the present disclosure the processing device of the first device 102 executes both operations A and operation B, it should be understood that operation A and operation B may also be performed by two or more different processing devices jointly or separately in the first device 102 (e.g., a first processing device executes operation A and a second processing device executes operation B, or vice versa, or the first and second processing devices jointly execute operations A and B).

The communication port 206 may facilitate data communications between the first device 102 and one or more other components of the system 100. For example, the communication port 206 may establish a connection (e.g., via the network 112) between the first device 102 and the second device 104. As another example, the communication port 206 may establish a connection between the first device 102 and the third device 106 (e.g., via the network 111). In some embodiments, the communication port 206 may be and/or include a standardized communication port, such as RS232, RS485, etc. In some embodiments, the communication port 206 may be specially designed. For example, the communication port 206 may be designed in accordance with analog signal transmission.

In some embodiments, the first device 102 may further include a storage device (not shown), such as an independent storage device or a storage device integrated into one or more components of the first device 102. Merely by way of example, the first device 102 may include a storage device configured to store data and/or instructions, such as a target hotspot list, identification information associated with a target hotspot, data and/or instructions for the processing device 204 to execute. In some embodiments, the storage device may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

Figure 2B:
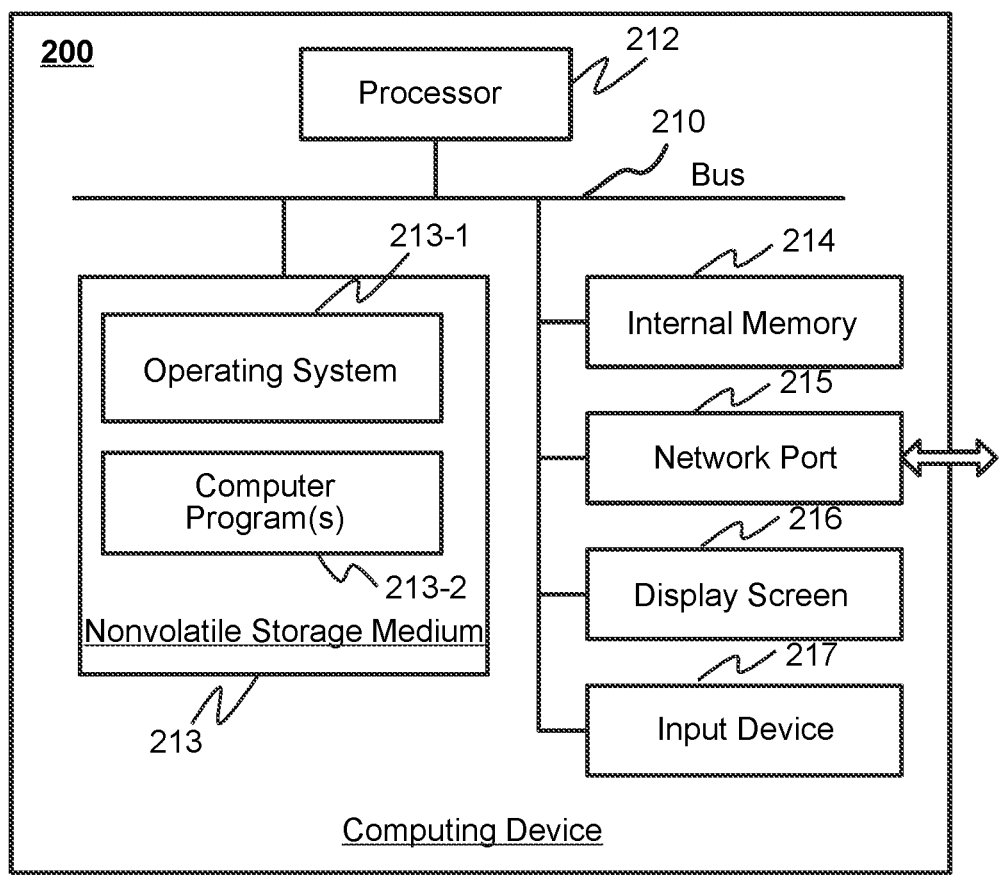
FIG. 2B is a schematic diagram illustrating exemplary hardware and/or software components of a computing device 200 according to some embodiments of the present disclosure.

FIG. 2B is a schematic diagram illustrating exemplary hardware and/or software components of a computing device 200 according to some embodiments of the present disclosure. The computing device 200 may be used to implement any component of the system 100 as described herein. For example, the processing device 204 may be implemented on the computing device 200 via its hardware, software program, firmware, or a combination thereof. Although only one such computing device is shown, for convenience, the computer functions relating to the processing device 204 of the first device 102 as described herein may be implemented in a distributed fashion on a number of similar platforms, to distribute the processing load.

As shown in FIG. 2B, the computing device 200 may include a processor 212, one or more storage devices, a network port 215, a display screen 216, an input device 217, etc., which are connected through a bus 210.

The processor 212 may be in the form of one or more processors (e.g., logic circuits), for executing program instructions. For example, the processor 212 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the first device 102) in the system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 210.

The storage device(s) of the computing device 200 may include a non-volatile storage medium 213 and an internal memory 214. In some embodiments, an operating system (e.g., iOS™, Android™, Windows Phone™, etc.) 213-1 and one or more computer programs 213-2 may be loaded into the non-volatile storage medium 213. The computer program(s) 213-2 may be executed by the processor 212 to implement methods (e.g., determining a target hotspot list and/or a target hotspot related to the second device 104) described elsewhere in the present disclosure. The internal memory 214 may provide an operating environment for the operating system 213-1 and the computer program(s) 213-2. The network port 215 may be used to communicate with external terminal(s) through a network connection. The display screen 216 may include a liquid crystal display screen or an electronic ink display screen and be configured to display data and/or information for a user. The input device 217 may include a touch layer covered on the display screen 216, or a button, a trajectory ball or a touchpad provided on a shell of the computing device 200, or an external keyboard, touchpad or mouse, to facilitate user interaction.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 3A:
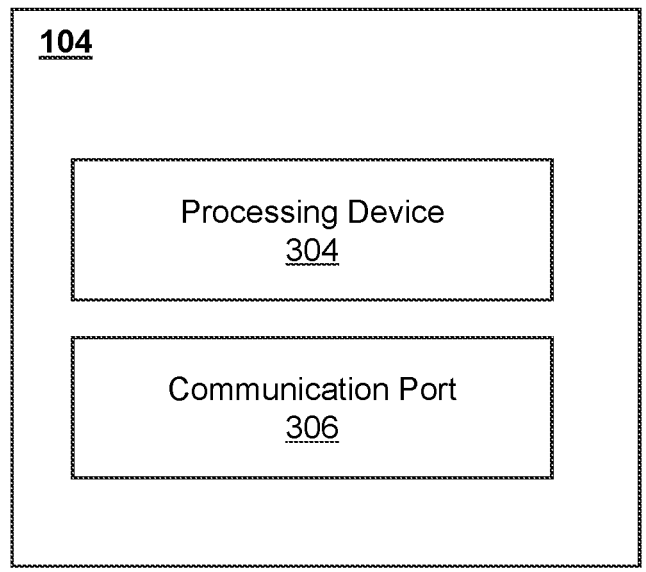
FIG. 3A is a schematic diagram illustrating an exemplary second device according to some embodiments of the present disclosure.

FIG. 3A is a schematic diagram illustrating an exemplary second device according to some embodiments of the present disclosure. As shown in FIG. 3A, the second device 104 may include a processing device 304 and a communication port 306.

The processing device 304 may process information and/or data relating to the second device 104 to perform one or more functions of the second device 104 described in the present disclosure. For example, the processing device 304 may detect one or more second hotspots based on one or more detection parameters obtained from the first device 102 and generate a second hotspot list based on the detected second hotspot(s). The processing device 304 may further send the second hotspot list to the first device 102. As another example, the processing device 304 may obtain identification information associated with a target hotspot from the first device 102 and be connected with the target hotspot based on the identification information. As a further example, the processing device 304 may determine whether a count of detected channels is larger than a preset count. In response to a determination that the count of detected channels is larger than the preset count, the processing device 304 may recover a connection between the first device 102 and the second device 104. In some embodiments, the processing device 304 may include one or more processing devices (e.g., single-core processing device(s) or multi-core processor(s)). Merely by way of example, the processing device 304 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

Merely for illustration, only one processing device may be described in the second device 104. However, it should be noted that the second device 104 of the present disclosure may also include multiple processing devices, and thus operations and/or method steps that are performed by one processing device as described in the present disclosure may also be jointly or separately performed by the multiple processing devices. For example, if in the present disclosure the processing device of the second device 104 executes both operations A and operation B, it should be understood that operation A and operation B may also be performed by two or more different processing devices jointly or separately in the second device 104 (e.g., a first processing device executes operation A and a second processing device executes operation B, or vice versa, or the first and second processing devices jointly execute operations A and B).

The communication port 306 may facilitate data communications between the second device 104 and one or more other components of the system 100. For example, the communication port 306 may establish a connection (e.g., via the network 112) between the first device 102 and the second device 104. As another example, the communication port 306 may establish a connection between the second device 104 and the third device 106 (e.g., via the network 113). In some embodiments, the communication port 306 may be and/or include a standardized communication port, such as RS232, RS485, etc. In some embodiments, the communication port 306 may be specially designed. For example, the communication port 206 may be designed in accordance with analog signal transmission.

In some embodiments, the second device 104 may further include an I/O (not shown) which enables user interaction with the second device 104. For example, the I/O may receive a request (e.g., a request to perform its function(s)) and/or data from a user of the second device 104. As another example, the I/O may display a target hotspot list received from the first device 102 to the user for selection. In some embodiments, the I/O may include an input component and/or an output component. Exemplary input components may include a keyboard, a mouse, a touch screen, a microphone, or the like, or a combination thereof. Exemplary output components may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), a touch screen, or the like, or a combination thereof.

In some embodiments, the second device 104 may further include a storage device (not shown), such as an independent storage device or a storage device integrated into one or more components of the second device 104. Merely by way of example, the second device 104 may include a storage device configured to store data and/or instructions, such as identification information associated with a target hotspot, data and/or instructions for the processing device 304 to execute. In some embodiments, the storage device may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

Figure 3B:
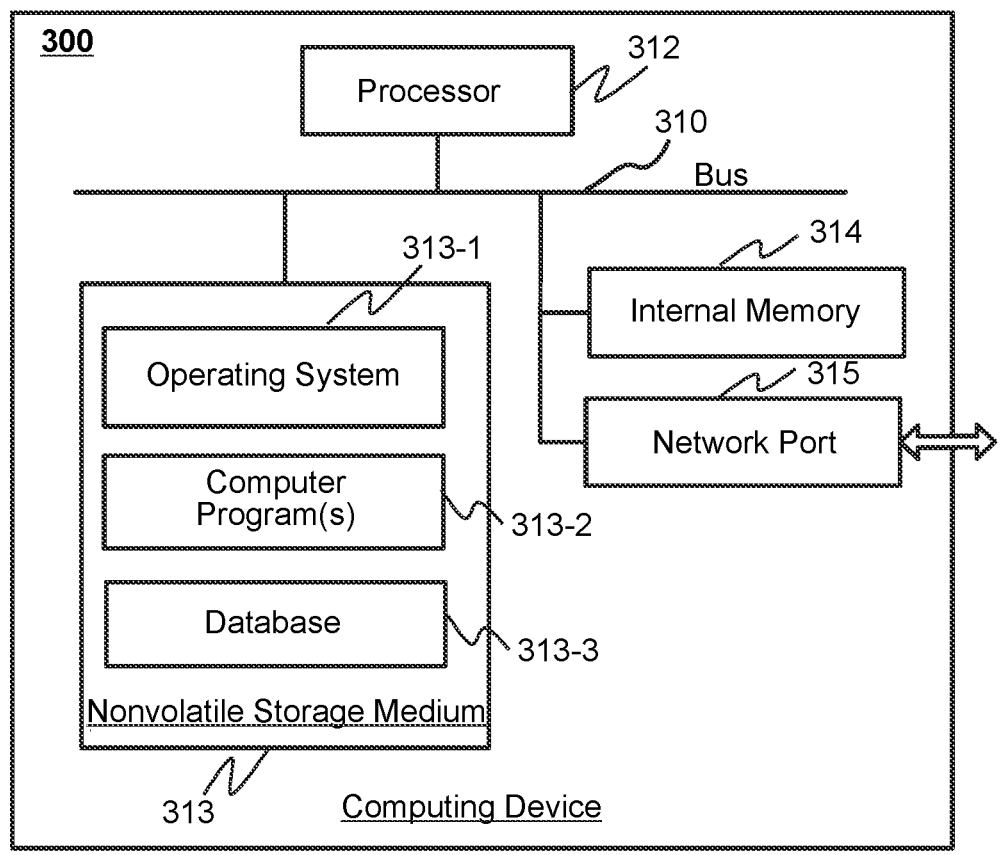
FIG. 3B is a schematic diagram illustrating exemplary hardware and/or software components of a computing device 300 according to some embodiments of the present disclosure.

FIG. 3B is a schematic diagram illustrating exemplary hardware and/or software components of a computing device 300 according to some embodiments of the present disclosure. The computing device 300 may be used to implement any component of the system 100 as described herein. For example, the processing device 304 may be implemented on the computing device 300 via its hardware, software program, firmware, or a combination thereof. Although only one such computing device is shown, for convenience, the computer functions relating to the processing device 304 of the second device 104 as described herein may be implemented in a distributed fashion on a number of similar platforms, to distribute the processing load.

As shown in FIG. 3B, the computing device 300 may include a processor 312, one or more storage devices, a network port 315, etc., which are connected through a bus 210.

The processor 312 may be in the form of one or more processors (e.g., logic circuits), for executing program instructions. For example, the processor 312 may include interface circuits and processing circuits therein. The interface circuits may be configured to receive electronic signals from a bus 310, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the second device 104) in the system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 310.

The storage device(s) of the computing device 300 may include a non-volatile storage medium 313 and an internal memory 314. In some embodiments, an operating system 313-1, one or more computer programs 313-2, and a database 313-3 may be loaded into the non-volatile storage medium 313. The computer program(s) 313-2 may be executed by the processor 312 to implement methods (e.g., determining a second hotspot list and/or whether a count of detected channels is larger than a preset count) described elsewhere in the present disclosure. The database 313-3 may be used to store data/information (e.g., hotspot information associated with one or more second hotspots) associated with the second hotspot list. The internal memory 314 may provide an operating environment for the operating system 313-1 and the computer program(s) 313-2. The network port 315 may be used to communicate with external terminal(s) through a network connection.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
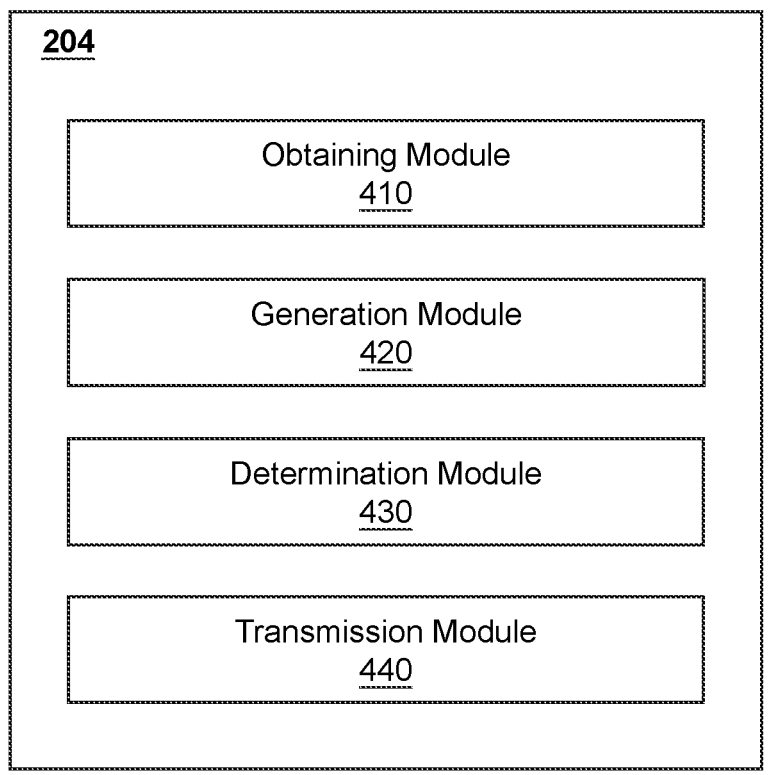
FIG. 4 is a schematic diagram illustrating an exemplary processing device according to some embodiments of the present disclosure.

FIG. 4 is a schematic diagram illustrating an exemplary processing device according to some embodiments of the present disclosure. The processing device 204 may be a part of the first device 102 as described elsewhere in the present disclosure. As shown in FIG. 4, the processing device 204 may include an obtaining module 410, a generation module 420, a determination module 430, and a transmission module 440.

The obtaining module 410 may be configured to obtain data and/or information from one or more components of the system 100. For example, the obtaining module 410 may obtain a first hotspot list from the generation module 420 of the first device 102. As another example, the obtaining module 410 may obtain/receive a second hotspot list generated by the second device 104 from the second device 104. As still another example, the obtaining module 410 may obtain a target hotspot list related to the second device 104 from the generation module 420 of the first device 102.

The generation module 420 may be configured to generate data and/or information associated with a network connection. For example, the generation module 420 may generate the first hotspot list by detecting available or discoverable hotspot(s) surrounding the first device 102. As another example, the generation module 420 may generate one or more detection parameters associated with at least one channel. As still another example, the generation module 420 may generate the target hotspot list based on the first hotspot list and the second hotspot list. More descriptions regarding the generation of the first hotspot list, the one or more detection parameters, and/or the target hotspot list may be found elsewhere in the present disclosure (e.g., FIG. 5 and the description thereof).

The determination module 430 may be configured to determine a target hotspot in the target hotspot list. For example, the determination module 430 may determine an initial target hotspot in the target hotspot list. The determination module 430 may determine identification information associated with the initial target hotspot. The determination module 430 may determine whether the first device 102 is capable of being connected with the initial target hotspot based on the identification information. The determination module 430 may further determine the target hotspot based on the determination result. More descriptions regarding the determination of the target hotspot may be found elsewhere in the present disclosure (e.g., FIG. 6 and relevant description thereof).

The transmission module 440 may be configured to facilitate communication between the first device 102 and one or more components of the system 100. For example, the transmission module 440 may send the one or more detection parameters to the second device 104. As another example, the transmission module 440 may send the identification information associated with the target hotspot to the second device 104 such that the second device 104 can be connected with the target hotspot based on the identification information.

The modules in the processing device 204 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the obtaining module 410 may include a unit for obtaining the first hotspot list and a unit for obtaining the second hotspot list. As another example, the generation module 430 may be divided into a plurality of units each of which may implement a portion of functions of the generation module 430. In some embodiments, the processing device 204 may include one or more additional modules. For example, the processing device 204 may include a storage module (not shown) for storing information and/or data (e.g., the target hotspot list and/or the identification information associated with the target hotspot) associated with the processing device 204.

Figure 5:
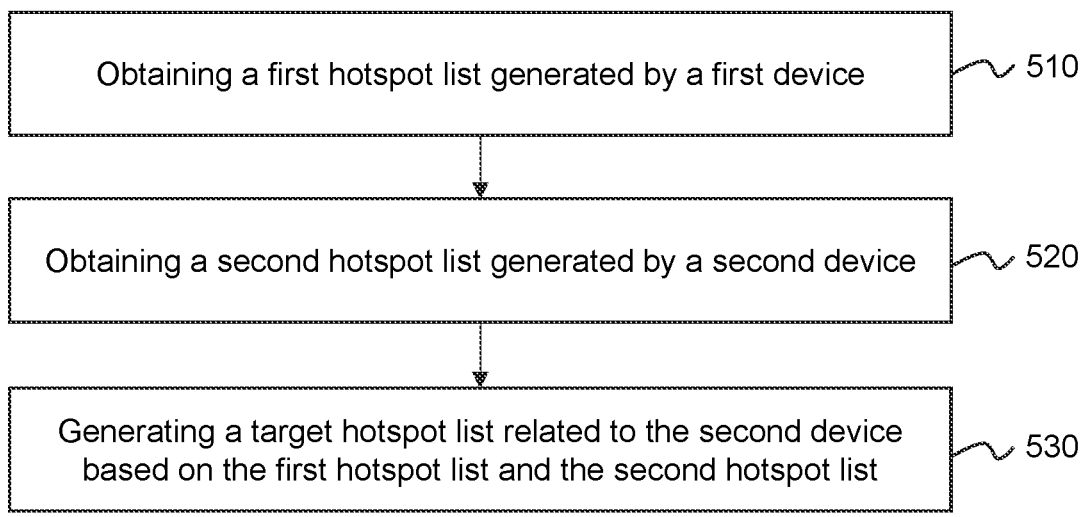
FIG. 5 is a flowchart illustrating an exemplary process for determining a target hotspot list according to some embodiments of the present disclosure.

FIG. 5 is a flowchart illustrating an exemplary process for determining a target hotspot list according to some embodiments of the present disclosure. In some embodiments, one or more operations in the process 500 may be implemented in the first device 102 of the system 100 illustrated in FIGS. 1, 2A, and 2B. For example, one or more operations in the process 500 may be stored in a storage device (e.g., the storage device described in FIG. 2A, and/or the internal memory 214 described in FIG. 2B) as a form of instructions, and invoked and/or executed by a processing device (e.g., the processing device 204, the processor 212, and/or one or more modules illustrated FIG. 4) The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 5 and described below is not intended to be limiting.

In 510, the processing device 204 (e.g., the obtaining module 410, the generation 420) may obtain a first hotspot list generated by a first device (e.g., the first device 102).

In some embodiments, the first hotspot list may include one or more first hotspots, hotspot information associated with at least one channel (also referred to as first hotspot information), channel information associated with the at least one channel (also referred to as first channel information), or the like, or any combination thereof. Each first hotspot may be within one of the at least one channel, that is, each first hotspot may be assigned to work in a specific channel. A channel within which at least one first hotspot is included may also be referred to as an available channel. As used herein, a channel may refer to a data signal transmission channel using wireless signal(s) (e.g., electromagnetic wave(s)) as a transmission carrier. Different channels may correspond to different channel numbers, different frequency ranges, different center frequencies, etc. In some embodiments, different channels may correspond to the same frequency band or different frequency bands (e.g., a frequency band of 2.4 GHz, 5 GHz, etc.). Merely by way of example, the frequency band of 2.4 GHz (also referred to as a 2.4 GHz band) may range from 2.4 GHz to 2.4835 GHz. The 2.4 GHz band may be divided into a plurality of channels (e.g., 11 channels, 13 channels, 14 channels, etc.) each of which has a frequency range and a center frequency. The frequency range may include a start frequency and an end frequency. The center frequency may be equal to an average of the start frequency and the end frequency. In some embodiments, some of the available channels may each correspond to a channel divided from the 2.4 GHz band.

In some embodiments, the hotspot information associated with the at least one channel (i.e., the first hotspot information) may be related to the first hotspot(s). Exemplary first hotspot information may include an access requirement, a security category, a signal quality, a maximum transmission rate, a supported network standard, a frequency band, a recommended access quantity, etc., of each of the first hotspot(s). The access requirement may be free or encrypted. The security category may include a safe category, an unsafe category, etc. The signal quality may include weak, normal, strong, or the like. The maximum transmission rate may include 1300 Mbps, 867 Mbps, 450 Mbps, 300 Mbps, 150 Mbps, etc. The supported network standard may include IEEE 802.11 ac, IEEE 802.11 n, IEEE 802.11 g, IEEE 802.11 b, etc. The frequency band may include 2.4 GHz band, 5 GHz band, or a dual-frequency band (i.e., working in both 2.4 GHz band and 5.0 GHz band). The recommendation access quantity may be indicated by a recommended number of accessed wireless devices. An exemplary recommended number may include 8, 16, 25, 128, etc. which can be a default setting or set by a user. Exemplary channel information associated with the at least one channel (i.e., first channel information) may include at least one of a count of first hotspot(s), a channel number, a frequency range, a center frequency, etc. of each of the at least one channel.

In some embodiments, the first device 102 may generate the first hotspot list by detecting available or discoverable hotspot(s) (i.e., the first hotspot(s)) surrounding the first device 102, e.g., by the processing device 204 (e.g., the generation device 420). For example, the processing device 204 may obtain the first hotspot information by scanning different existing channels to discover whether any hotspot is currently available. As another example, the processing device 204 may retrieve information of each first hotspot from a storage device of the first device 102. Additionally, the processing device 204 may determine the first channel information based on the hotspot information. Further, the processing device 204 may generate the first hotspot list based on the first hotspot information and/or the first channel information.

In 520, the processing device 204 (e.g., the obtaining module 410, the determination module 430, the transmission module 440) may obtain a second hotspot list generated by a second device (e.g., the second device 104).

In some embodiments, the second hotspot list may include one or more second hotspots detected by the second device 104, second hotspot information, and/or second channel information associated with the second hotspot(s) detected by the second device 104, etc. The second hotspot(s) may be the same as or different from the first hotspot(s). For example, the second device 104 may have a same or similar detection capacity with the first device 102 and/or be close to the first device 104, such that the second hotspot(s) may be the same as the first hotspot(s). As another example, the second device 104 and the first device 102 may have different wireless capacities, e.g., the second device 104 may work in the 2.4 GHz band while the first device 102 may work in a dual-frequency band (e.g., both the 2.4 GHz and the 5 GHz). Therefore, a portion of the first hotspot(s) (e.g., first hotspot(s) detected by the first device 1-2 in the 5 GHz) may not be detected by the second device 104 and the second hotspot(s) may be the same as some of the first hotspot(s). As still another example, the second device 104 may be relatively away from the first device 102, such that a first portion of the second hotspot(s) may be the same as a portion of the first hotspot(s), and a second portion of the second hotspot(s) may be different from the first hotspot(s). The description of the second hotspot information and the second channel information may be similar to the description of the first hotspot information and the first channel information, respectively, which is not repeated here.

In some embodiments, the processing device 204 (e.g., the generation module 430) may generate one or more detection parameters related to the first hotspot(s) based on the first channel information. The detection parameter(s) may include at least one of the channel number, a detection duration, the count of first hotspot(s), a count of detection times, the frequency range, the center frequency, etc., of each of the at least one channel.

The detection duration of a channel refers to a time duration within which the second device is instructed to discover available hotspots in the channel. The detection duration of each of the at least one channel may be determined based on the count of first hotspots of the channel and/or the hotspot information associated with the channel. For example, a detection duration of each first hotspot in each of the at least one channel may be relatively fixed. The processing device 204 may determine the detection duration of each of the at least one channel based on the count of first hotspots in the channel and/or the detection duration of each first hotspot in the channel. The greater the count of the first hotspots in the channel is, the longer the detection duration of the channel may be. The less the count of the first hotspots in the channel is, the shorter the detection duration of the channel may be. As another example, the processing device 204 may further determine a count of first hotspots with a safe type (also referred to as safe first hotspots) of each of the at least one channel. The larger the count of safe first hotspots of the channel is, the longer the detection duration of the channel may be. As still another example, the processing device 204 may further determine a count of first hotspots with weak quality (also referred to as weak first hotspots) of each of the at least one channel. The less the count of weak first hotspots of the channel is, the longer the detection duration of the channel may be. As still another example, the processing device 204 may further determine a count of first hotspots with a dual-frequency band of each of the at least one channel. The greater the count of first hotspots with a dual-frequency band of the channel is, the longer the detection duration of the channel may be. As a further example, the processing device 204 may determine an average rate of first hotspots based on maximum transmission rates of the first hotspots of each of the at least one channel. The less the average rate of first hotspots of the channel is, the longer the detection duration of the channel may be.

The count of detection times refers to a count of times according to which the second device is repeatedly instructed to discover available hotspots in the channel. The count of detection times may be determined based on the count of first hotspots of the channel and/or the hotspot information associated with the channel, which is similar to the determination of the detection duration of the channel and not repeated here.

Further, the first device 102 (e.g., the transmission module 440 of the processing device 204) may send the one or more detection parameters to the second device 104. After the second device 104 receives the one or more detection parameters from the first device 102, the second device 104 may detect the second hotspot(s) in the at least one channel based on the one or more detection parameters and generate the second hotspot list based on the detected second hotspot(s). The second device 104 may then send the second hotspot list to the first device 102, such that the processing device 204 may receive the second hotspot list from the second device 104. In some embodiments, the second hotspot list may be generated by the second device 104 by detecting available or discoverable hotspot(s) surrounding the second device 104 periodically or intermittently (e.g., in real-time), which is similar to the generation of the first hotspot list. The second device 104 may then send the second hotspot list to the first device 102, such that the processing device 204 may receive the second hotspot list from the second device 104. More descriptions regarding the generation of the second hotspot list may be found elsewhere in the present disclosure (e.g., FIG. 8 and the description thereof).

In 530, the processing device 204 (e.g., the generation module 420) may generate a target hotspot list related to the second device 104 based on the first hotspot list and the second hotspot list.

In some embodiments, the processing device 204 may determine a type of each of the one or more first hotspots in the first hotspot list. For example, the processing device 204 may determine a frequency band associated with each of the first hotspot(s) based on the first hotspot information and determine the type of each first hotspot based on the frequency band of the first hotspot. For instance, if a frequency band associated with a specific first hotspot is the 2.4 GHz band, the type of the specific first hotspot may be designated as a 2.4 GHz type. Alternatively, if a frequency band associated with the specific first hotspot is the 5 GHz band, the type of the specific first hotspot may be designated as a 5 GHz type. In some embodiments, the processing device 204 may determine one or more candidate hotspots based on the type of each of the first hotspot(s). For example, the processing device 204 may determine a detection capacity of the second device 104. The detection capacity of the second device 104 may reflect a frequency band that the second device 104 can detect. The processing device 204 may determine the one or more candidate hotspots based on the detection capacity and the type of each of the one or more first hotspots. The one or more candidate hotspots may be of a type consistent with the detection capacity of the second device 104. For instance, if the detection capacity of the second device 104 only covers the 2.4 GHz band, the processing device 204 may determine a portion of the one or more first hotspots that are of the 2.4 GHz type as the one or more candidate hotspots, and remove the other portion of the one or more first hotspots (e.g., of the 5 GHz type).

Further, the processing device 204 may generate the target hotspot list based on the one or more candidate hotspots and the one or more second hotspots in the second hotspot list. For example, the processing device 204 may identify one or more specific candidate hotspots that are different from the one or more second hotspots. The processing device 204 may generate the target hotspot list based on the one or more specific candidate hotspots and the one or more second hotspots. In some embodiments, the target hotspot list may include at least one of the one or more specific candidate hotspots and the one or more second hotspots. For example, the processing device 204 may determine the one or more specific candidate hotspots and the one or more second hotspots as initial hotspot(s). The processing device 204 may identify at least one of the initial hotspot(s) that satisfies a preset condition. The preset condition may be associated with at least one of a preset signal quality, a preset safety, a preset type of a network protocol, a preset access requirement, or a preset data transmission rate. Taking the preset signal quality (e.g., a weak signal quality) as an example, the processing device 204 may remove hotspot(s) with a weak signal quality from the initial hotspot(s) and designate remaining hotspot(s) in the initial hotspot(s) as the initial hotspot(s) satisfying the preset condition. Taking the preset safety as another example, the processing device 204 may keep safe hotspot(s) in the initial hotspot(s) and designate the safe hotspot(s) as the initial hotspot(s) satisfying the preset condition. In response to a determination that the at least one of the initial hotspot(s) satisfies a preset condition, the processing device 204 may generate the target hotspot list based on the at least one of the initial hotspot(s). In some embodiments, the processing device 204 may generate the target hotspot list by ranking the at least one of the initial hotspot(s) according to a specific order. Merely by way of example, the processing device 204 may determine a data transmission rate of each of the at least one of the initial hotspot(s). The processing device 204 may generate the target hotspot list by ranking the at least one of the initial hotspot(s) according to a descending order of the data transmission rate. As another example, the processing device 204 may determine a value reflecting a signal quality of each of the at least one of the initial hotspot(s). The larger the signal quality is, the larger the corresponding value may be. The processing device 204 may generate the target hotspot list by ranking the at least one of the initial hotspot(s) according to a descending order of the signal quality.

In some embodiments, the target hotspot list may be presented or displayed to a user via the first device 102 (e.g., the I/O module 202 of the first device 102). The user may select a target hotspot in the hotspot list via the first device for network connection. The processing device 204 may send identification information associated with the target hotspot to the second device 104, such that the second device 104 may be connected with the target hotspot. More description regarding the determination of the target hotspot may be found elsewhere in the present disclosure (e.g., FIG. 6 and the description thereof).

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added in the process 500 and/or one or more operations of the process 500 described above may be omitted. For example, an operation for generating one or more detection parameters may be added between operation 510 and operation 520. As another example, an operation for determining a target hotspot and sending the identification information associated with the target hotspot to the second device 104 may be added after operation 530. As still another example, an operation for establishing a connection between the first device 102 and the second device 104 may be added before operation 520.

Figure 6:
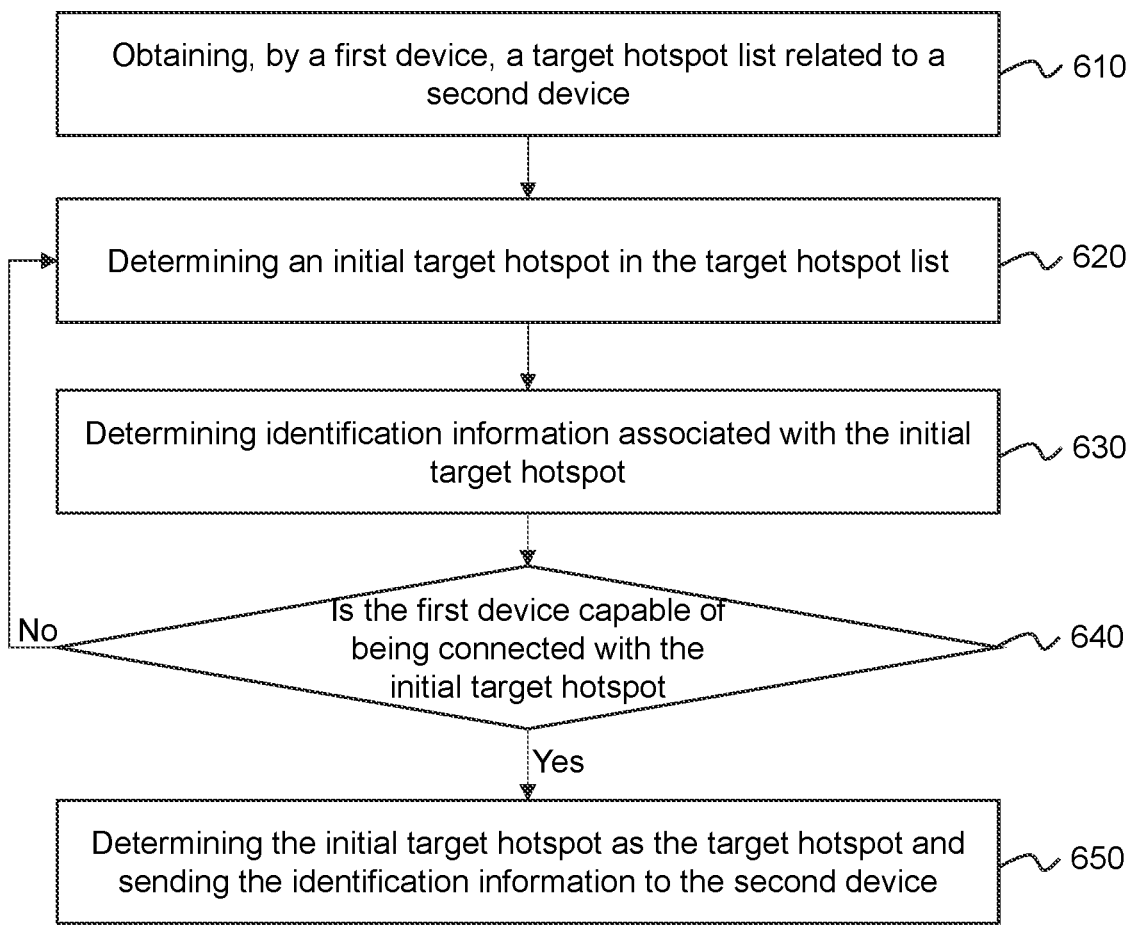
FIG. 6 is a flowchart illustrating an exemplary process for determining a target hotspot according to some embodiments of the present disclosure.

FIG. 6 is a flowchart illustrating an exemplary process for determining a target hotspot according to some embodiments of the present disclosure. In some embodiments, one or more operations in the process 600 may be implemented in the first device 102 of the system 100 illustrated in FIGS. 1, 2A, and 2B. For example, one or more operations in the process 600 may be stored in a storage device (e.g., the storage device described in FIG. 2A, and/or the internal memory 214 described in FIG. 2B) as a form of instructions, and invoked and/or executed by a processing device (e.g., the processing device 204, the processor 212, and/or one or more modules illustrated FIG. 4) The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 6 and described below is not intended to be limiting.

In 610, the processing device 204 (e.g., the obtaining module 410) may obtain, by a first device (e.g., the first device 102), a target hotspot list related to a second device (e.g., the second device 104).

The target hotspot list related to the second device 104 may be the same as or similar to that described in operation 530 in FIG. 5. The target hotspot list may include one or more hotspots that are within a detection capacity of the second device 104. In some embodiments, the first device 102 may generate the target hotspot list based on a first hotspot list generated by the first device 102 and a second hotspot list generated by the second device 104 according to process 500 as described in FIG. 5, which is not repeated here. In some embodiments, the target hotspot list may be stored in a storage device of the first device 102. The processing device 204 may obtain the target hotspot list from the storage device of the first device 102.

In 620, the processing device (e.g., the determination module 430) may determine an initial target hotspot in the target hotspot list.

In some embodiments, the processing device 204 may determine the initial target hotspot based on a ranking of the one or more hotspots in the target hotspot list. For example, the processing device 204 may determine a top-ranked hotspot in the target hotpot list as the initial target hotspot. In some embodiments, the processing device 204 may determine the initial target hotspot in the target hotspot list according to a user selection. For example, the processing device 204 may display the target hotspot list via the first device 102 to the user. The user may select any one of the one or more hotspots in the target hotspot list as the initial target hotspot.

In 630, the processing device 204 (e.g., the determination module 430) may determine identification information associated with the initial target hotspot.

As used herein, the identification information (also referred to as a hotspot parameter) may be related to any authentication mode (e.g., password authentication, certificate authentication, fingerprint authentication, validated code authentication, etc.) that can allow a device to be connected with the initial target hotspot via a network connection. Exemplary identification information may include an account password, certificate information (e.g., a certificate number), a fingerprint, a validated code (e.g., a dynamic validated code), or the like, or any combination thereof.

In some embodiments, the identification information associated with the initial target hotspot may be stored in a storage device of the first device 102 and/or input by a user of the first device 102. Taking the account password as an example, the processing device 204 may determine whether the account password associated with the initial target hotspot is stored in the storage device of the first device 102. In response to a determination that the account password is stored in the storage device of the first device 102, the processing device 204 may obtain the account password from the storage device of the first device 102. In response to a determination that the account password is not stored in the storage device of the first device 102, the processing device 204 may generate a request for obtaining the account password and display the request via the first device 102 to the user. The user may input the password via the first device 102 such that the processing device 204 may receive the account password based on the user input. Further, after the processing device 204 determines the identification information, the processing device 204 may try to connect the first device 102 with the initial target hotspot based on the identification information.

In 640, the processing device 204 (e.g., the determination module 430) may determine whether the first device 102 is capable of being connected with the initial target hotspot.

In response to a determination that the first device 102 is capable of being connected with the initial target hotspot, the process 600 may proceed to operation 650. In response to a determination that the first device 102 is not capable of being connected with the initial target hotspot, the process 600 may proceed to repeat operations 620-640. In some embodiments, the processing device 204 may further record and/or analyze the failure connection. For example, the processing device 204 may analyze a failure reason (e.g., inaccurate identification information, a limitation of the access quantity, etc.) for the failed connection. The processing device 204 may label the failure connected initial target hotspot by corresponding failure reason. In some embodiments, the processing device 204 may determine whether to reconnect the first device 102 with the initial target hotspot based on the failure reason. Merely by way of example, for failure reason being the inaccurate identification information, the processing device 204 may generate a request for obtaining updated identification information associated with the initial target hotspot. The processing device 204 may receive the updated identification information and try to reconnect the first device 102 with the initial target hotspot based on the updated identification information. As another example, the processing device 204 may abandon connecting the first device 102 with the initial target hotspot in response to determining that a preset count of failed connections is reached.

In 650, the processing device 204 (e.g., the determination module, the transmission module 440) may determine the initial target hotspot as the target hotspot and send the identification information to the second device 104, such that the second device 104 can be connected with the target hotspot based on the identification information. In some alternative embodiments, the second device 104 may pre-store the identification information. After the verification that the first device 102 can be connected with the initial target hotspot, the second device 104 may retrieve the pre-stored identification information to connect to the target hotspot.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added in the process 600, and/or one or more operations of the process 600 described above may be omitted. For example, operations 620 and 630 may be performed by a single operation. As another example, an operation for controlling the second device 104 to perform its one or more functions by the first device 102 may be added after operation 650.

Figure 7:
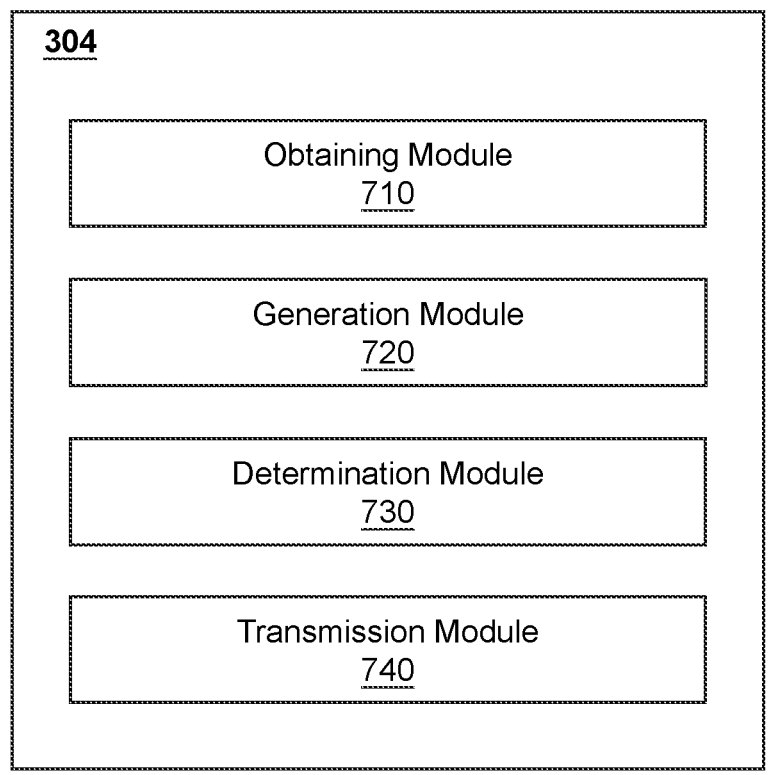
FIG. 7 is a schematic diagram illustrating an exemplary processing device according to some embodiments of the present disclosure.

FIG. 7 is a schematic diagram illustrating an exemplary processing device according to some embodiments of the present disclosure. The processing device 304 may be a part of the second device 104 as described elsewhere in the present disclosure. As shown in FIG. 7, the processing device 304 may include an obtaining module 710, a generation module 720, a determination module 730, and a transmission module 740.

The obtaining module 710 may be configured to obtain data and/or information from one or more components of the system 100. For example, the obtaining module 710 may obtain one or more detection parameters associated with at least one channel from the first device 102. As another example, the obtaining module 710 may obtain/receive identification information associated with a target hotspot from the first device 102.

The generation module 720 may be configured to generate a second hotspot list. For example, the generation module 720 may generate the second hotspot list by detecting available or discoverable hotspot(s) surrounding the second device 104 periodically or intermittently (e.g., in real-time), which is similar to the generation of the first hotspot list. As another example, the generation module 720 may generate the second hotspot list based on the one or more detection parameters. More descriptions regarding the generation of the second hotspot list may be found elsewhere in the present disclosure (e.g., operation 820 in FIG. 8 and relevant description thereof).

The determination module 730 may be configured to determine whether a count of continuously detected channels is larger than a preset count. The determination module 730 may recover a connection between the first device 102 and the second device 104 based on the determination result. More descriptions may be found elsewhere in the present disclosure (e.g., operation 820 in FIG. 8 and relevant description thereof).

The transmission module 740 may be configured to facilitate communication between the second device 104 and one or more components of the system 100. For example, the transmission module 740 may send the second hotspot list to the first device 102 such that the first device 102 can generate a target hotspot list related to the second device 104 based on the second hotspot list.

The modules in the processing device 304 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the processing device 304 may include a storage module (not shown) for storing information and/or data (e.g., the second hotspot list and/or the identification information associated with the target hotspot) associated with the processing device 304.

Figure 8:
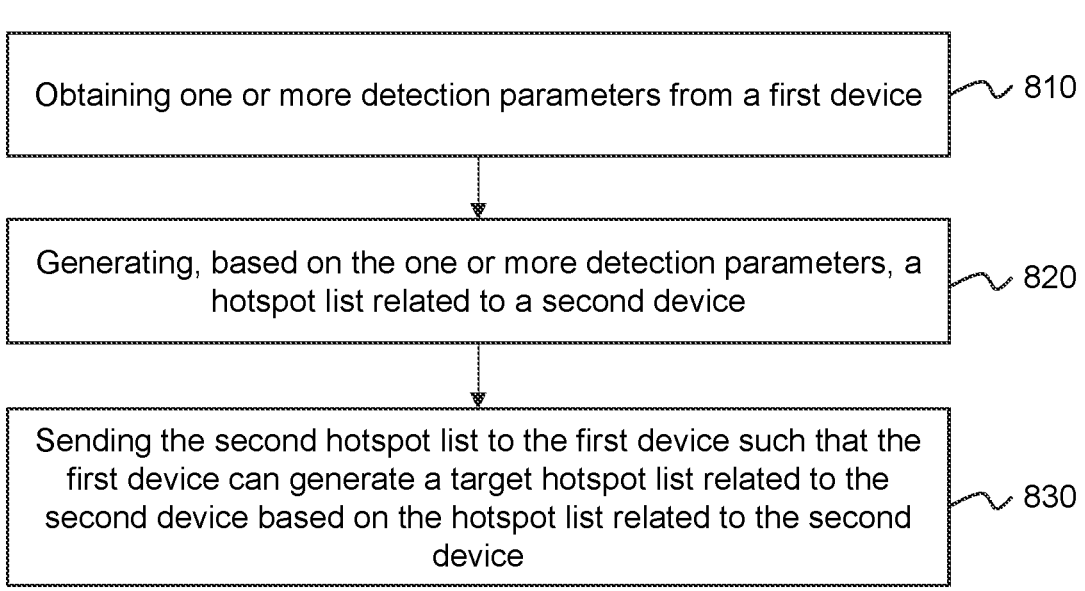
FIG. 8 is a flowchart of an exemplary process for data transmission in an intercom system according to some embodiments of the present disclosure.

FIG. 8 is a flowchart of an exemplary process for data transmission in an intercom system according to some embodiments of the present disclosure. In some embodiments, one or more operations in the process 800 may be implemented in the second device 104 of the system 100 illustrated in FIGS. 1, 3A, and 3B. For example, one or more operations in the process 800 may be stored in a storage device (e.g., the storage device described in FIG. 3A, and/or the internal memory 314 described in FIG. 2B) as a form of instructions, and invoked and/or executed by a processing device (e.g., the processing device 304, the processor 312, and/or one or more modules illustrated FIG. 7) The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 8 and described below is not intended to be limiting. The process 800 may be implemented when the second device is in the soft AP mode.

In 810, the processing device 304 (e.g., the obtaining module 710) may obtain one or more detection parameters from a first device (e.g., the first device 102).

In some embodiments, in connection with FIG. 5, the one or more detection parameters may be associated with the at least one channel and include at least one of the channel number, the detection duration, the count of first hotspot(s), the count of detection times, the frequency range, the center frequency, etc., of each of the at least one channel.

In some embodiments, when the second device is in the soft AP mode, the second device 104 may serve as a hotspot to establish a connection with the first device 102. More descriptions regarding the establishment of the connection between the first device 102 and the second device 104 may be found elsewhere in the present disclosure (e.g., FIG. 1 and relevant description thereof). The first device 102 may generate the one or more detection parameters and send the one or more detection parameters to the second device 104 by the connection (e.g., the network 112), such that the processing device 304 may receive the one or more detection parameters from the first device 102.

In 820, the processing device 304 (e.g., the generation module 720, the determination module 730) may generate, based on the one or more detection parameters, a hotspot list related to the second device 104 (also referred to as a second hotspot list).

In some embodiments, as described in connection with FIG. 5, the second hotspot list may include one or more second hotspots detected by the second device 104, second hotspot information and/or second channel information associated with the second hotspot(s), etc. The processing device 304 may detect available or discoverable hotspot(s) (i.e., the second hotspot(s)) surrounding the second device 104 based on the one or more detection parameters. For example, the processing device 304 may obtain the second hotspot information by scanning at least one channel based on the detection parameters. As another example, the processing device 304 may receive information of each second hotspot from a storage device of the second device 104. Additionally, the processing device 304 may determine the second channel information based on the second hotspot information. Further, the processing device 304 may generate the second hotspot list based on the second hotspot information and/or the second channel information.

In some embodiments, the processing device 304 may perform the detection/scan process periodically or intermittently. Merely by way of example, when the second device 104 is idle, the processing device 304 may perform the detection process based on stored detection parameters in the second device 104 to generate and store a candidate hotspot list. When the processing device 304 receives the one or more detection parameters from the first device 102, the processing device 304 may compare the one or more detection parameters and the stored detection parameters. In response to determining that the one or more detection parameters and the stored detection parameters are the same, the processing device 304 may determine the candidate hotspot list as the second hotspot list without performing the detection process based on the one or more detection parameters. In response to determining that the one or more detection parameters and the stored detection parameters are different, the processing device 304 may perform the detection process on a portion of the at least one channel to generate a second candidate hotspot list. Detection parameters associated with the portion of the at least one channel may be different from corresponding stored detection parameters. The processing device 304 may further determine the second hotspot list based on the second candidate hotspot list and the candidate hotspot list.

In some embodiments, during the detection process for the one or more second hotspots, the processing device 304 may determine whether a count of continuously detected channels is larger than a preset count (e.g., 1, 2, 3, 4, 5, 6, 7, etc.). In response to determining that the count of continuously detected channels is larger than the preset count, the processing device 304 may return to a channel via which the first device 102 is connected with the second device 104 and recover the connection between the first device 102 and the second device 104. As used herein, a recovering operation may refer to switching the second device 104 to the channel within which the second device 102 can exchange (e.g., receive and/or send from and/or to) information with the first device 102 and keeping the connection between the first device 102 and the second device 104 alive. In some embodiments, during the detection process, the second device 104 may be required to send a feedback to the first device 102 in response to a message sent by the first device 102. Once the first device 102 cannot receive the feedback from the second device 104 for a certain time period, the first device 102 may determine that a disconnection occurs between the first device 102 and the second device 104. In such cases, by the recovering operation of the second device 104, the second device 104 may receive the message and send the feedback in response to the message to the first device 102, thus avoiding that the first device 102 cannot detect the second device 104. Taking the preset count of 3 as an example, in response to determining that the count of continuously detected channels is larger than 3, the processing device 304 may recover the connection between the first device 102 and the second device 104. After the recovering operation, the processing device 304 may continue to perform the detection process, i.e., switching to another channel to detect whether there is any hotspot in that channel.

In 830, the processing device 304 (e.g., the transmission module 740) may send the second hotspot list to the first device 102 such that the first device 104 can generate a target hotspot list related to the second device 102 based on the hotspot list related to the second device 104 (i.e., the second hotspot list). More descriptions regarding the generation of the target hotspot list may be found elsewhere in the present disclosure (e.g., operations 530 in FIG. 5 and relevant descriptions thereof).

In some embodiments, the processing device 304 (e.g., the obtaining module 710) may obtain identification information of a target hotspot from the first device 102 such that the second device 104 may be connected with the target hotspot based on the identification information via a network connection. After the second device 104 receives the identification information, the second device 104 may switch from the soft AP mode to the STA mode to connect with the target hotspot. More descriptions regarding the determination of the target hotspot in the hotspot list may be found elsewhere in the present disclosure (e.g., FIG. 6 and the description thereof).

It should be noted that the above description regarding the process 800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more additional operations may be added in the process 800, and/or one or more operations of the process 800 described above may be omitted. For example, an operation for receiving the identification information associated with the target hotspot may be added after operation 830. As another example, an operation for storing data/or information (e.g., the second hotspot list) generated by the processing device 304 may be added after operation 820.

Figure 9:
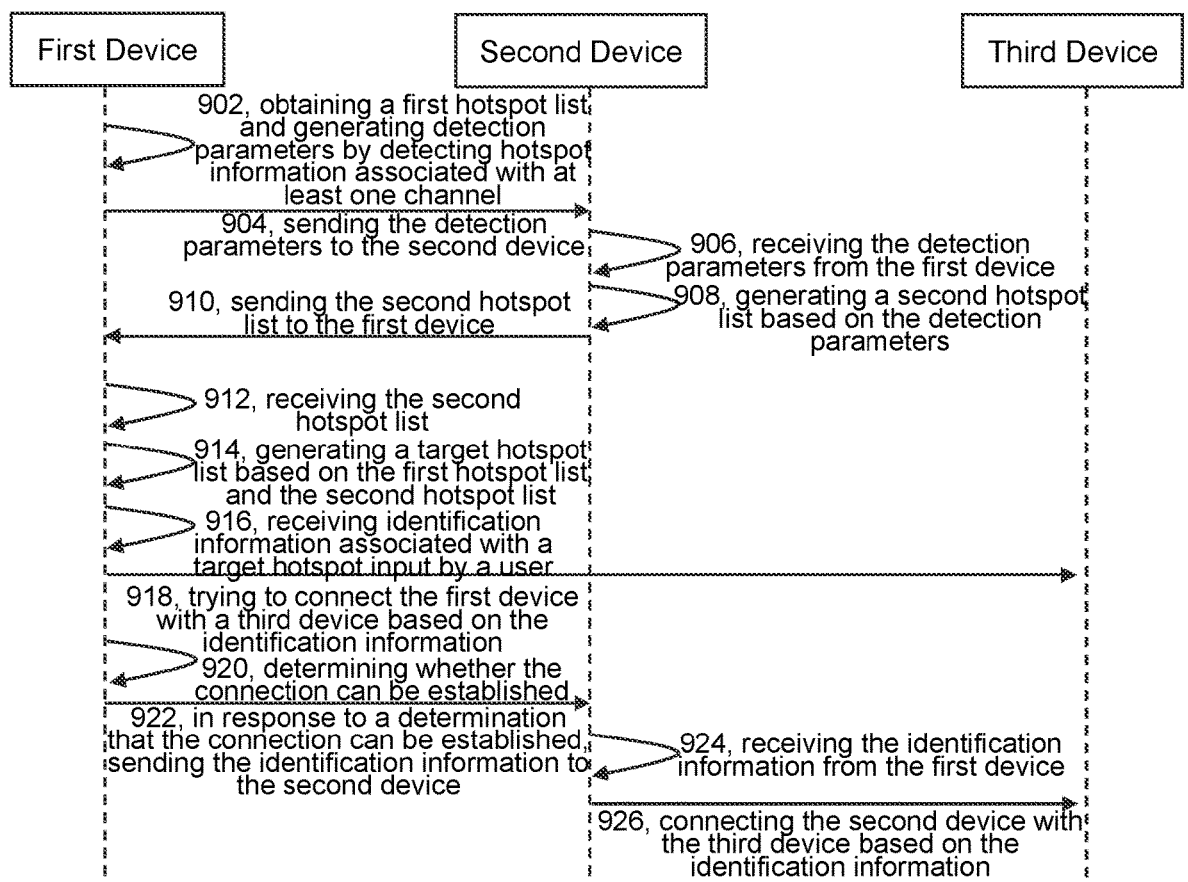
FIG. 9 is a schematic diagram illustrating an exemplary process for network connection according to some embodiments of the present disclosure.

FIG. 9 is a schematic diagram illustrating an exemplary process for network connection according to some embodiments of the present disclosure. The process 900 may be implemented by a cooperation of a first device (e.g., the first device 102), a second device (e.g., the second device 104), and/or a third device (e.g., the third device 106). As shown in FIG. 9, operations 902, 904, 912, 914, 916, 918, 920, and 922 may be performed by the first device 102. Operations 906, 908, 910, 924, and 920 may be performed by the second device 104.

In 902, the first device 102 may obtain a first hotspot list and generate detection parameters by detecting hotspot information associated with at least one channel. More descriptions regarding the obtaining the first hotspot list and the generation of the detection parameters may be found elsewhere in the present disclosure (e.g., operations 510 and 520 in FIG. 5 and relevant descriptions thereof).

In 904, the first device 102 may send the detection parameters to the second device 104.

In 906, the second device 104 may receive the detection parameters from the first device 102.

In 908, the second device 104 may generate a second hotspot list based on the detection parameters. More descriptions regarding the generation of the second hotspot list may be found elsewhere in the present disclosure (e.g., operation 820 and the description thereof).

In 910, the second device 104 may send the second hotspot list to the first device 102.

In 912, the first device 102 may receive the second hotspot list.

In 914, the first device 102 may generate a target hotspot list based on the first hotspot list and the second hotspot list. More descriptions regarding the generation of the target hotspot list may be found elsewhere in the present disclosure (e.g., operation 530 in FIG. 5 and the description thereof).

In 916, the first device 102 may receive identification information associated with a target hotspot input by a user. More descriptions regarding the receiving of the identification information may be found elsewhere in the present disclosure (e.g., operation 630 in FIG. 6 and the relevant description thereof).

In 918, the first device 102 may try to connect the first device 102 with the third device 106 based on the identification information.

In 920, the first device 102 may determine whether the connection can be established (i.e. whether the first device 102 is capable of being connected with the third device 106). More descriptions regarding the determination of whether the connection is capable may be found elsewhere in the present disclosure (e.g., operation 640 in FIG. 6 and the description thereof).

In 922, in response to a determination that the connection can be established, the first device 102 may send the identification information to the second device 104.

In 924, the second device 104 may receive the identification information from the first device 102.

In 926, the second device 104 may be connected with the third device 106 based on the identification information.

In some embodiments, before operation 926, the second device 104 may be in the soft AP mode. In operation 926, the second device 104 may switch from the soft AP mode to the STA mode.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
   at least one storage device including a set of instructions; and
   at least one processor in communication with the at least one storage device, wherein when executing the set of instructions, the at least one processor is configured to direct the system to perform operations including:
   obtaining a first hotspot list generated by a first device, the first hotspot list including one or more first hotspots detected by the first device;
   obtaining a second hotspot list generated by a second device, the second hotspot list including one or more second hotspots detected by the second device; and
   generating a target hotspot list related to the second device based on the first hotspot list and the second hotspot list.

2. The system of claim 1, wherein the obtaining a second hotspot list generated by a second device includes:
   generating one or more detection parameters related to the one or more first hotspots;
   sending the one or more detection parameters to the second device; and
   receiving the second hotspot list from the second device, wherein the second hotspot list is generated based on the one or more detection parameters.

3. The system of claim 2, wherein the generating one or more detection parameters includes:
   obtaining hotspot information associated with at least one channel, wherein each of the one or more first hotspots is within one of the at least one channel;
   determining channel information based on the hotspot information; and
   generating the one or more detection parameters based on the channel information.

4. The system of claim 3, wherein the one or more detection parameters include at least one of a channel number, a detection duration, a count of first hotspots, a count of detection times, a frequency range, or a center frequency, of each of the at least one channel.

5. The system of claim 1, wherein the generating a target hotspot list related to the second device based on the first hotspot list and the second hotspot list includes:
   determining a type of each of the one or more first hotspots;
   determining one or more candidate hotspots based on the type of each of the one or more first hotspots; and
   determining the target hotspot list based on the one or more candidate hotspots and the one or more second hotspots.

6. The system of claim 5, wherein the determining a type of each of the one or more first hotspots includes:
   determining a frequency band associated with each of the one or more first hotspots; and
   determining the type of each of the one or more first hotspots based on the frequency band associated with each of the one or more first hotspots.

7. The system of claim 5, wherein the determining the target hotspot list based on the one or more candidate hotspots and the one or more second hotspots includes:
   determining, based on the one or more candidate hotspots and the one or more second hotspots, one or more initial hotspots;
   determining that at least one of the one or more initial hotspots satisfies a preset condition; and
   determining the target hotspot list based on the at least one of the one or more initial hotspots.

8. The system of claim 7, wherein the preset condition is associated with at least one of a preset signal quality, a preset safety, a preset type of a network protocol, a preset access requirement, or a preset data transmission rate.

9. The system of claim 1, wherein the at least one processor is configured to direct the system to perform the operations further including:
   determining a first target hotspot in the target hotspot list;
   determining first identification information associated with the first target hotspot;
   determining whether the first device is capable of being connected with the first target hotspot based on the first identification information; and
   in response to a determination that the first device is capable of being connected with the first target hotspot based on the first identification information, sending the first identification information to the second device such that the second device can be connected with the first target hotspot.

10. The system of claim 9, wherein the at least one processor is configured to direct the system to perform the operations further including:
    in response to a determination that the first device is not capable of being connected with the first target hotspot based on the identification information,
    determining a second target hotspot in the target hotspot list; and
    determining second identification information associated with the second hotspot.

11. A system, comprising:
    at least one storage device including a set of instructions; and
    at least one processor in communication with the at least one storage device, wherein when executing the set of instructions, the at least one processor is configured to direct the system to perform operations including:
    obtaining one or more detection parameters from a first device;
    generating, based on the one or more detection parameters, a hotspot list related to a second device;
    sending the hotspot list to the first device, wherein the first device can generate a target hotspot list related to the second device based on the hotspot list.

12. The system of claim 11, wherein the one or more detection parameters include at least one of a channel number, a detection time, a count of hotspots, a count of detection times, a frequency range, or a center frequency, of at least one channel.

13. The system of claim 12, wherein the generating, based on the one or more detection parameters, a hotspot list includes:
- detecting, based on the one or more detection parameters, one or more hotspots in the at least one channel, during which:
  - determining whether a count of detected channels is larger than a preset count; and
  - in response to determining that the count of detected channels is larger than the preset count, recovering a connection between the first device and the second device; and
- generating the hotspot list based on the one or more hotspots.

14. The system of claim 11, wherein the at least one processor is configured to direct the system to perform the operations further including:
- obtaining identification information associated with a target hotspot in the target hotspot list from the first device; and
- connecting the second device with the target hotspot based on the identification information.

15. A system, comprising:
- at least one storage device including a set of instructions; and
- at least one processor in communication with the at least one storage device, wherein when executing the set of instructions, the at least one processor is configured to direct the system to perform operations including:
  - obtaining, by a first device, a target hotspot list related to a second device;
  - determining a target hotspot in the target hotspot list; and
  - sending identification information associated with the target hotspot to the second device such that the second device can be connected with the target hotspot.

16. The system of claim 15, wherein the determining a target hotspot in the target hotspot list includes:
- determining a first initial target hotspot in the target hotspot list;
- determining first identification information associated with the first initial target hotspot;
- determining whether the first device is capable of being connected with the first initial target hotspot based on the first identification information; and
- in response to a determination that the first device is capable of being connected with the first initial target hotspot based on the first identification information, determining the first initial target hotspot as the target hotspot.

17. The system of claim 16, wherein the sending identification associated with the target hotspot to a second device includes:
- in response to a determination that the first device is capable of being connected with the first initial target hotspot based on the first identification information, sending the first identification information to the second device.

18. The system of claim 16, wherein the at least one processor is configured to direct the system to perform the operations further including:
- in response to a determination that the first device is not capable of being connected with the first initial target hotspot based on the first identification information,
  - determining a second initial target hotspot in the target hotspot list; and
  - determining second identification information associated with the second candidate hotspot.

19. The system of claim 15, wherein the obtaining a target hotspot list includes:
- obtaining a first hotspot list generated by the first device, the first hotspot list including one or more first hotspots detected by the first device;
- obtaining a second hotspot list generated by the second device, the second hotspot list including one or more second hotspots detected by the second device; and
- generating the target hotspot list related to the second device based on the first hotspot list and the second hotspot list.

20. The system of claim 19, wherein the obtaining a second hotspot list generated by the second device includes:
- generating one or more detection parameters related to the one or more first hotspots;
- sending the one or more detection parameters to the second device; and
- receiving the second hotspot list from the second device, wherein the second hotspot list is generated based on the one or more detection parameters.

* * * * *